Sept. 20, 1938.   E. CLARK   2,130,524
NONSKID TIRE
Filed July 8, 1936
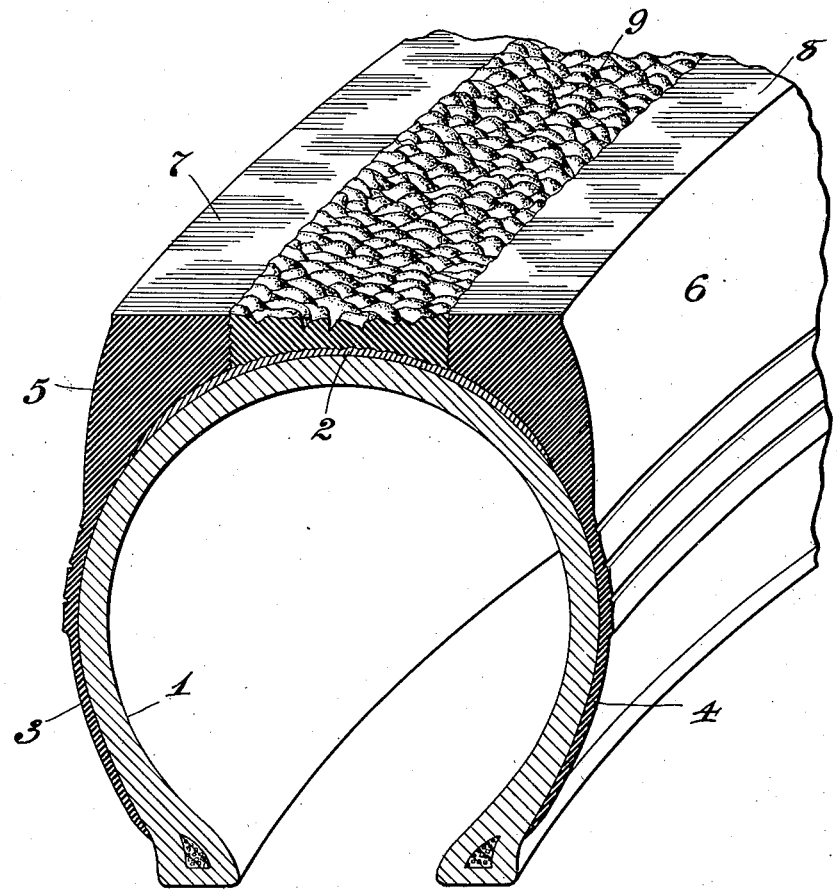
INVENTOR
Ernest Clark
BY
ATTORNEYS Patented Sept. 20, 1938

2,130,524

UNITED STATES PATENT OFFICE 2,130,524

NONSKID TIRE

Ernest Clark, East Orange, N. J.

Application July 8, 1936, Serial No. 89,493

2 Claims. (Cl. 152—209)

This invention relates to a non-skid tire, and has for an object to provide a tire, which may be either pneumatic, cushion, or solid, with an improved tread that embodies anti-skidding and non-slipping qualities to a high degree; that is very durable; and that gives relatively little resistance to road travel.

Another object consists in providing such a tire tread which combines compounded vulcanized rubber and crepe rubber in such a way as to attain the desired results with a maximum of efficiency.

A further object consists in providing certain improvements in the form, construction and arrangement of the several parts, whereby the above named and other objects may effectively be attained.

A practical embodiment of the invention is represented in the accompanying drawing, which shows a perspective sectional view of a motor vehicle tire casing having a tread formed according to my invention.

In the drawing, the usual fabric carcass of the casing is denoted generally by 1, and the usual breaker strip by 2. These parts may be constructed and associated in any well known and approved manner, together with the usual cushion rubber intervening between the carcass and breaker strip. As this procedure is thoroughly understood by operatives in this industry, there appears to be no occasion to describe the same herein.

The tire also embodies the usual rubber side walls, which are marked 3 and 4. These side walls may be composed of the usual rubber compound that is applied to the fabric carcass in the customary way, and vulcanized thereon; all as thoroughly understood by operatives in this industry.

As is familiar, the side walls develop into the tread portion of the tire, which latter is generally composed of a rubber compound calculated to have a maximum resistance to wear. According to my invention, the tread portions on both sides, denoted by 5, 6, are formed so as to provide substantial flat surfaces 7, 8 on the outer circumference or road engaging element of the tire. In the drawing, these surfaces 7, 8, are shown as plain but they may, if desired, be provided with any suitable form of non-skid configuration.

The tread portions 5, 6 are separated by a longitudinal circumferential channel or groove in which is located a band 9 that is composed of crepe rubber which consists, as generally understood in this art, or rubber that has been coagulated, passed through the rollers of a rubber mill, and then "cold cured" as, for instance, by treatment with suitable chemicals. The differential speed of the mill rollers has a kind of masticating effect upon the rubber, and produces a sheet the surfaces of which are lumpy or nodulated, as indicated in the drawing. The thickness of these sheets of crepe rubber may be varied somewhat by the setting of the mill rollers. This material, which is a familiar one in this industry, is extremely tough, resilient and wear-resisting. Its uneven or nodulated surface, as well as the inherent nature of the material itself, provides an excellent non-skidding or anti-slipping surface.

I prefer largely to eliminate the irregularity of the surface on the inner side of the band 9 before placing it adjacent the breaker strip 2 and intermediate the portions 5, 6, prior to hot vulcanization, thereby promoting its union with the other elements of the tire.

After the parts have been thus assembled, the whole tire may be vulcanized or cured in an enclosing metallic mold, with internal fluid pressure, all as is thoroughly understood in this art; or the built-up tire may be vulcanized in any other well known or approved manner.

I prefer to form the inner surface of the mold section that engages the tread surface of the tire with a peripheral strip or beading that is slightly convex and of approximately the same width as the crepe rubber band 9 of the tire. This feature causes the mold, during vulcanization pressure and temperature, to form the outer surface of the band 9 so that it is slightly concave in cross section, as is also shown in the drawing. This depresses most, if not all, of the surface of the band 9 below the surfaces 7, 8, so that, in use, the weight of the vehicle is ordinarily mainly carried upon the surfaces 7, 8.

The effect of the vulcanizing temperature and pressure is firmly to unite all the elements of the tire, in a well understood way, so that a practically unitary structure is obtained. However, this hot vulcanization will not substantially change the character of the crepe rubber which, as previously indicated, is coagulated and toughened by what is known as an acid treatment, sometimes referred to as a "cold cure", although it will act sufficiently upon the crepe rubber to bring about the firm union with the other tire elements, above mentioned. This union will be more complete than is indicated in the drawing, as the different rubber elements will, so to speak, flow together or amalgamate under the influence of the hot vulcanization.

When in use on a vehicle, the tire will ordinarily ride or roll principally on the compounded rubber surfaces 7, 8 and, as these surfaces only constitute a portion of the width of the entire tread, there will be very little resistance to the travel of the tire upon the road. However, when any sudden excess pressure occurs as, for instance, that resulting from braking action or tendency to slip or skid, the tire tread will be deformed sufficiently for the central band 9 to come into close contact with the road surface and exert its non-skid or anti-slipping effect. In this way, the tire is constructed with an effective non-skid means which does not substantially increase the resistance of the tire to the motion of the vehicle, but which means is in position automatically to become effective when occasion for its functioning arises in the use of the vehicle.

In case the wear on the tire should result in bringing about substantial evenness of the surfaces 7, 8, and the surface of the crepe rubber band 9, the usability and efficiency of the tire will not be seriously impaired, although it may have somewhat more resistance to the movement of rolling or travelling on the road surface.

This slightly concave cross sectional form of the outer surface of the band 9 involves another advantage which arises in the use of the tire since, when the tread is deflected inwardly in a radial direction by contact with a stone, or analogous obstruction, there is less bending or distortion of the tire carcass because there is less tread rubber to be pushed inwardly at the point of contact with the obstruction. While this advantage is most pronounced in the case of a slightly concave tread surface, as above mentioned, it will also obtain to a substantial degree should wear upon the tire cause the tread surface to become substantially flat since, even in that condition, there is obviated the usual cross sectional convexity of tread surface.

Furthermore, the fact that the crepe rubber band 9 extends inwardly to the carcass or breaker strip of the tire, causes the anti-slipping or non-skid quality to be maintained during the useful life of the tire, as distinguished from the customary type of figured non-skid treads that are largely or wholly removed by wear so as to leave, in effect, a smooth tread.

By the arrangement above described, I have provided a tire that embodies all the advantages of a compounded rubber tread and of a crepe rubber tread, while neither the compounded rubber nor the crepe rubber hampers or defeats the normal or characteristic efficiency of the other.

When, in the claims, I refer to "crepe" rubber, I mean rubber that has been coagulated and milled to produce what is commonly known in the industry as "crepe" rubber, or the equivalent thereof; as distinguished, particularly, from the heavily compounded rubber usually employed in tire treads, and from rubber that is merely deposited from organic solutions of rubber or latex.

Although I have shown, in the drawing, my invention as applied to a pneumatic tire casing; it is, as previously indicated, also applicable to the treads of cushion or solid tires.

It will be understood that various changes may be resorted to in the form, material, construction, and arrangement of the several parts, without departing from the spirit and scope of my invention; hence I do not intend to be limited to the details herein set forth except as they may be included in the claims.

What I claim is:

1. A tire having a tread portion provided at its side edges with circumferential bands of hot vulcanized compounded rubber, and provided at a point intermediate its side edges with a circumferential band composed of substantially uncompounded crepe rubber, the bands being united with each other and with the tire body by hot vulcanization.

2. A tire having a tread portion provided at its side edges with circumferential bands of hot vulcanized compounded rubber, and provided at a point intermediate its side edges with a circumferential band composed of substantially uncompounded nodulated cold cured crepe rubber, the nodulated outer surface of the crepe rubber band lying inwardly in a radial direction from the outer surfaces of the compounded rubber bands and the bands being united with each other and with the tire body by hot vulcanization without substantially affecting the physical characteristics of the crepe rubber band, whereby the tire is adapted normally to roll on the compounded rubber bands and to gain non-skid traction efficiency from the crepe rubber band under conditions of stress.

ERNEST CLARK.